United States Patent [19]
Kawasaki et al.

[11] Patent Number: 5,135,065
[45] Date of Patent: Aug. 4, 1992

[54] VEHICULAR HEIGHT CONTROLLING ARRANGEMENT IN AUTOMOTIVE VEHICLE

[75] Inventors: Akira Kawasaki, Novi, Mich.; Yasuo Mori, Gifu, Japan; Koji Takase, Gifu, Japan; Akira Kani, Gifu, Japan

[73] Assignee: Nissan Motor Co., Ltd., Yokohama, Japan

[21] Appl. No.: 651,852

[22] Filed: Feb. 7, 1991

[30] Foreign Application Priority Data

Feb. 13, 1990 [JP] Japan .................................. 2-32122

[51] Int. Cl.⁵ .................. B60G 21/067; B60G 21/073
[52] U.S. Cl. ..................................... 180/41; 280/6.12; 280/707; 280/709; 280/714; 280/703
[58] Field of Search ............... 280/689, 702, 703, 707, 280/709, 714, 840, 6.1, 6.12; 180/41

[56] References Cited

U.S. PATENT DOCUMENTS

| | | | |
|---|---|---|---|
| 4,185,845 | 1/1980 | Misch et al. | 280/707 X |
| 4,686,626 | 8/1987 | Kuroki et al. | 280/703 X |
| 4,741,554 | 5/1988 | Okamoto | 280/703 |

FOREIGN PATENT DOCUMENTS

| | | | |
|---|---|---|---|
| 58-12816 | 1/1983 | Japan . | |
| 59-156813 | 9/1984 | Japan . | |
| 60-4406 | 1/1985 | Japan . | |
| 0261513 | 11/1987 | Japan | 280/707 |
| 0020208 | 1/1988 | Japan | 280/703 |
| 0031809 | 2/1988 | Japan | 280/707 |
| 0166614 | 7/1988 | Japan | 280/703 |
| 0095921 | 4/1989 | Japan | 280/707 |
| 0162108 | 6/1990 | Japan | 280/703 |

Primary Examiner—Kenneth R. Rice
Assistant Examiner—Tamara L. Graysay
Attorney, Agent, or Firm—Lowe, Price, LeBlanc & Becker

[57] ABSTRACT

A vehicular height controlling arrangement changing a length of a suspension cylinder by supplying or draining the hydraulic oil through a damping force selector valve. The damping force selector valve changes a damping force of a suspension cylinder by changing an orifice therein. When the vehicular height is lowered under a vehicle stopping condition, a large orifice is selected in the damping force selector valve so as to quickly lower the vehicular height. Thereafter, a small orifice is immediately selected to suppress the swinging of the automotive vehicle.

12 Claims, 2 Drawing Sheets

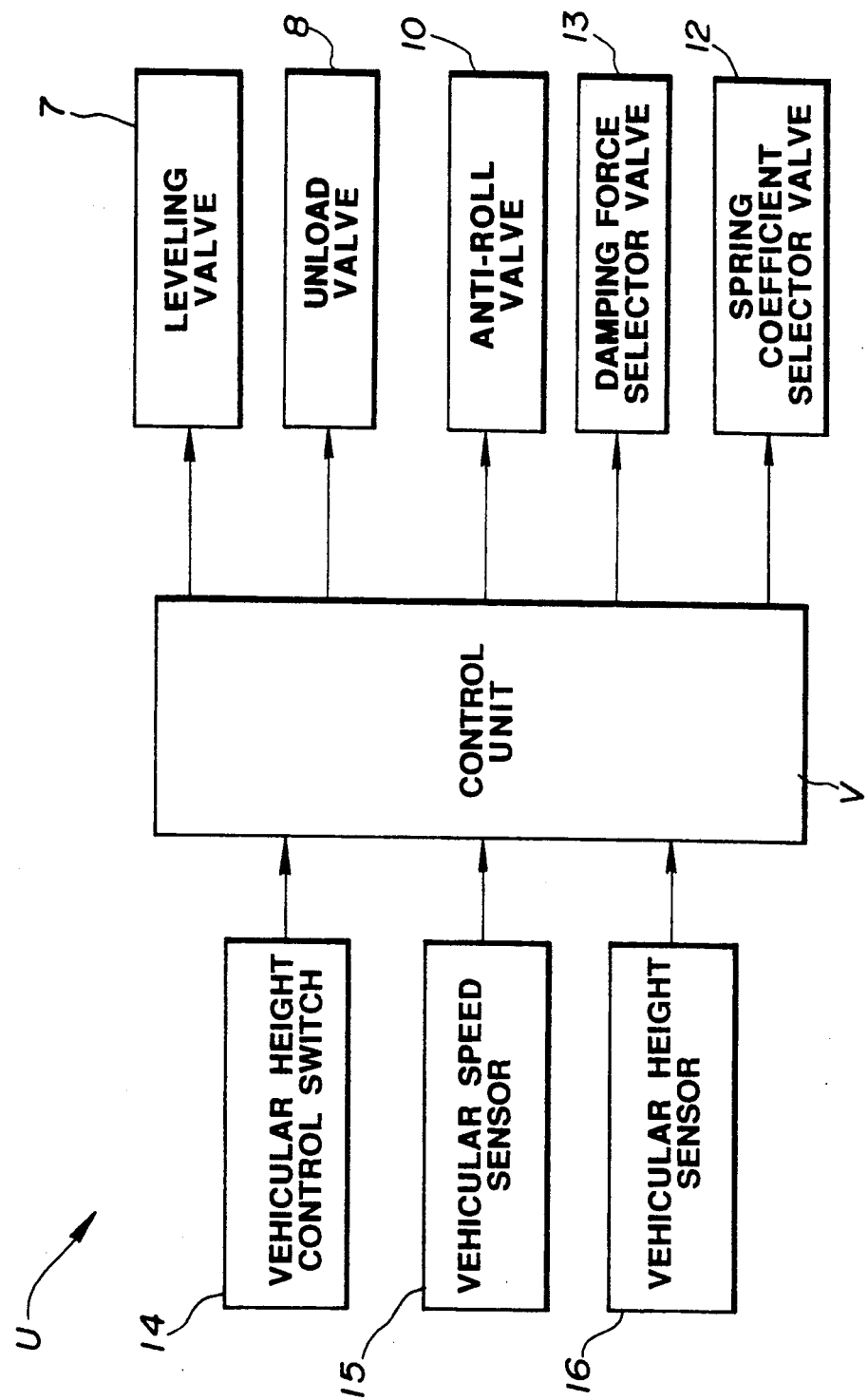

VEHICULAR HEIGHT CONTROLLING ARRANGEMENT IN AUTOMOTIVE VEHICLE

BACKGROUND OF THE INVENTION

1. Field of the Invention

The present invention relates to improvements in a vehicular height controlling arrangement with which a vehicular height is quickly adjusted under a vehicle stopping condition.

2. Description of the Prior Art

It is well known that an automotive vehicle is equipped with a suspension unit adjustable in vehicular height. The vehicular height is automatically lowered with the suspension unit under a stopping condition in order to improve an easiness of a getting on or off. Such a suspension unit is disclosed, for example, in Japanese Patent Provisional Publication No. 58-12816.

Additionally, Japanese Patent Provisional Publication No. 60-4406 discloses a suspension unit in which a damping force is variable in several degrees and a suspension spring coefficient is variable in its value. The suspension unit is adjusted under a stopping condition so that the suspension unit is set to have a large damping force and the suspension spring is set to have a high spring coefficient in order to suppress the swinging of the automotive vehicle caused by the getting on or off of passengers or loads.

Furthermore, Japanese Patent Provisional Publication No. 59-156813 discloses a suspension control system provided with a damper variable in its damping force and an air spring variable in its spring coefficient by controlling a spring coefficient changing valve disposed between the air spring and an accumulator.

However, with such conventional arrangements, a vehicular height is adjusted by supplying or draining driving oil through the damping force selector valve which is set to have a large damping force (a small orifice is selected). Accordingly, when the vehicular height is adjusted under a condition that the suspension cylinder has a large damping force while the vehicle is stopped, it takes a considerably long time to finish the adjusting of the vehicular height. Therefore, it causes a problem that a passenger is required to wait for a time before getting off the vehicle.

SUMMARY OF THE INVENTION

It is an object of the present invention to provide an improved vehicular height controlling arrangement with which a vehicular height is quickly lowered under a vehicle stopping condition.

Another object of the present invention is to provide an improved vehicular height controlling arrangement in which the damping force is set in large to suppress the swinging of the automotive vehicle after quick lowering of the vehicular height.

A vehicular height controlling arrangement for use in an automotive vehicle, according to the present invention comprises means for changing a vehicular height when operated. A vehicular speed sensor detects a speed of the automotive vehicle and outputs a first signal representative of stoppage of the automotive vehicle. A suspension cylinder is connected to a body of the automotive vehicle and changeable in its length and damping force. A damping force selector valve is hydraulically connected to the suspension cylinder. The damping force selector valve takes one of a first state in which said suspension cylinder damping force taking a minimum value and a second state in which said suspension cylinder damping force taking a maximum value larger than that in the first state. A control unit is electrically connected to the vehicular height changing means, the vehicular speed sensor and the damping force selector valve. The control unit includes means which outputs a second signal to the damping force selector valve to cause the damping force selector valve to take the first state, when the vehicular height changing means is operated and in response to the first signal.

With this arrangement, a quick lowering of the vehicular height and a suppression of the vehicular swinging are realized under a vehicle stopping condition. Furthermore, a hydraulic circuit of this arrangement keeps pressurized oil therein and keep the vehicular height at its lowest level even if an engine of the automotive vehicle is stopped. Therefore, when the engine is re-started, the vehicular height controlling operation is easily carried out by using a small amount of hydraulic oil.

BRIEF DESCRIPTION OF THE DRAWING

FIG. 2 is a block diagram showing the vehicular height controlling system of the present invention.

DETAILED DESCRIPTION OF THE INVENTION

Figure 1:
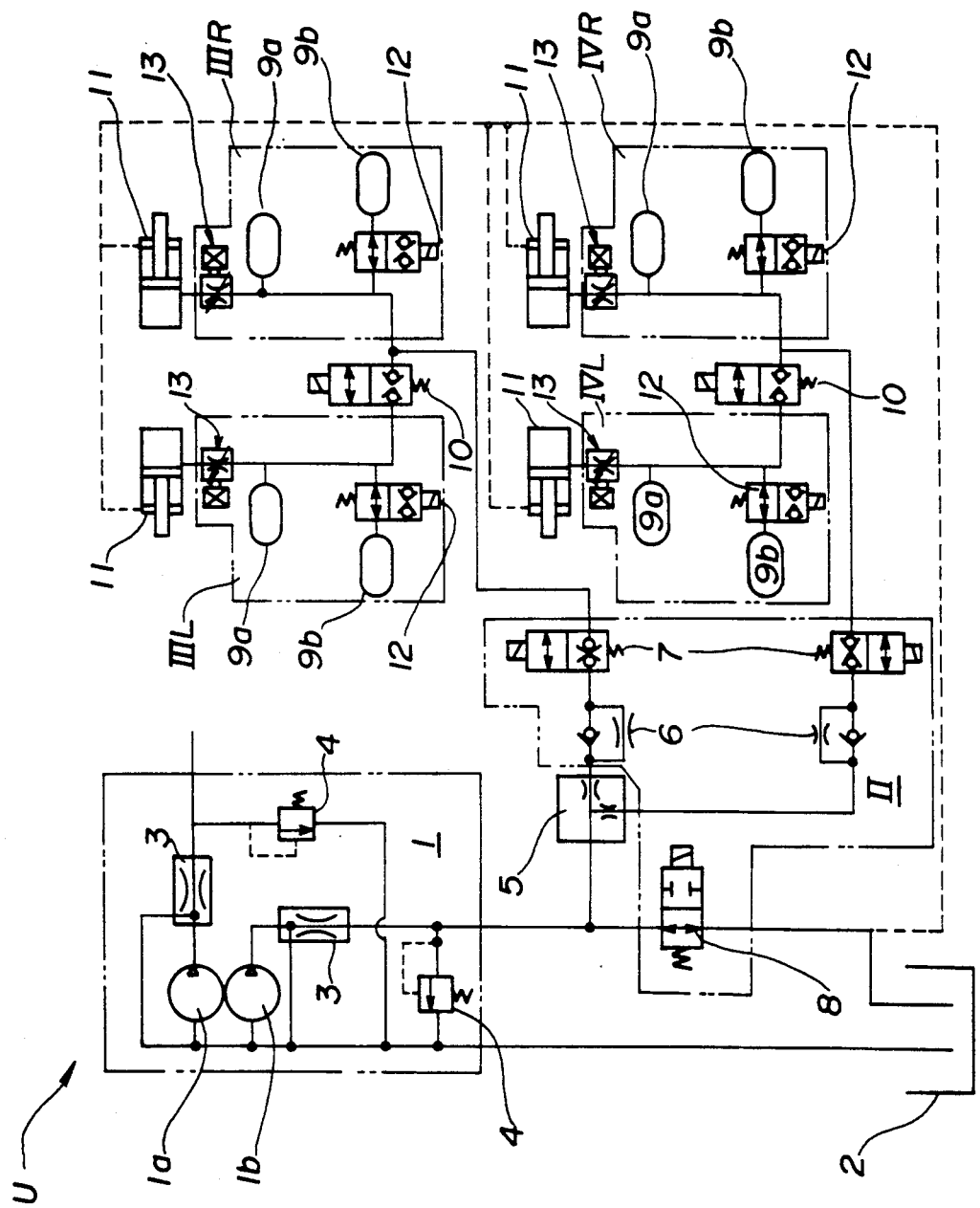
FIG. 1 is a hydraulic circuit diagram of an embodiment of a vehicular height controlling arrangement according to the present invention.

Referring now to FIG. 1, an embodiment of a vehicular height controlling arrangement of an automotive vehicle according to the present invention is illustrated by reference character U.

The vehicular height controlling arrangement U comprises an oil pressure source I including two pumps 1a and 1b. Operation oil in a reservoir 2 is sucked by the pumps 1a and 1b and sent to a power steering system (not shown) and a leveling unit II after being controlled in pressure by a pressure control valve 3 and a relief valve 4 installed in the oil pressure source I.

The oil from the pressure source I is branched off to two lines (no numeral). One of the lines is connected to a flow divider 5. The flow divider 5 is disposed between the oil pressure source I and the leveling unit II so as to further stabilize oil pressure.

The leveling unit II includes front and rear suspension circuits (no numeral) which are respectively connected to the flow divider 5. Each of the suspension circuits has a check valve 6 and a leveling valve 7 for controlling a flow rate of returning oil. The check valve 6 is connected upstream of the leveling valve 7. The other passage from the oil pressure source I is connected to an unload valve 8 which is operated corresponding to the action of the leveling valve 7. The unload valve 8 acts to restrict a flow rate of the oil from the oil pressure source I and suspension units $III_R$, $III_L$, $IV_R$ and $IV_L$ to the reservoir 2.

The oil from the oil pressure source I is sent to the suspension units $III_R$, $III_L$, $IV_R$ and $IV_L$ through the leveling units II when each of the leveling valves 7 is opened in case that a vehicular height is changed. When the leveling valve 7 is closed after the vehicular height is changed, the pressurized oil from the oil pressure source I is returned to the reservoir 2 through the unload valve 8.

The oil passed through the leveling valves 7 is supplied to the front right and left suspension units $III_R$ and $III_L$ and the rear right and left suspension units $IV_R$ and $IV_L$. An anti-roll valve 10 is disposed upstream of the front left suspension unit $III_L$ so as to suppress the rolling of the automotive vehicle. Similarly, the other anti-roll valve 10 is disposed upstream of the rear left suspension unit $IV_L$. Each of the front suspension units $III_R$ and $III_L$ is provided with accumulators 9a and 9b. The accumulator 9b is disposed on the way of the oil passage through a spring coefficient selector valve 12. Another accumulator 9a is disposed upstream of a damping force selector valve 13 which is disposed in each of the front suspension units $III_R$ and $III_L$ and connected to each front suspension cylinder 11. The damping force selector valve 13 is formed so that a suitable orifice is selected according to the vehicular condition. When a large orifice is selected, the damping force becomes small. When a small orifice is selected, the damping force becomes large.

The rear suspension units $IV_R$ and $IV_L$ are similarly provided with the accumulators 9a and 9b, the anti-roll valve 10, the spring coefficient selector valve 12 and the damping force selector valve 13 and connected to each rear suspension cylinder 11.

Each of the suspension units $III_R$, $III_L$, $IV_R$ and $IV_L$ is connected to an inlet of an oil chamber of the suspension cylinder 11 so that the hydraulic oil is supplied to the suspension cylinder 11 through each of the suspension units $III_R$, $III_L$, $IV_R$ and $IV_L$. An outlet of the oil chamber of the suspension cylinder 11 is connected to the reservoir 2.

As schematically shown in FIG. 2, a control unit V for controlling the valves 7, 8, 12 and 13 is electrically connected to a vehicular speed sensor 15 operated corresponding to a value of a speedometer (not shown) and a vehicular height sensor 16 installed between each wheel axle and the vehicular body. The control unit V receives signals of the vehicular speed sensor 15 and the vehicular height sensor 16 upon receiving a signal indicating whether a vehicular height control switch 14 is turned on or off. The control unit V processes the received signals and sends control signals to the valves 7, 8, 12 and 13.

The manner of operation of the thus arranged vehicular height controlling arrangement will be discussed hereinafter.

In order to raise the vehicular height, each of the leveling valves 7 and the anti-roll valves 10 is opened while the unload valve 8 is closed. With this operation, the oil from the oil pressure source I is equally sent to each of the suspension units $III_R$, $III_L$, $IV_R$ and $IV_L$. The oil acts to push a piston rod of each suspension cylinder 11 while receiving a restriction in flow rate by the valves 12 and 13.

When the unload valve 8 is opened under this condition, the oil from the oil pressure source I and the oil from the suspension units are returned to the reservoir 2 upon being restricted in flow rate by the valves 5, 12 and 13, so that the vehicular height is gradually decreased.

Since each of the suspension units $III_R$, $III_L$, $IV_R$ and $IV_L$ receives an equal pressure by the oil from the oil pressure source I, the height of a part near each suspension unit $III_R$, $III_L$, $IV_R$, $IV_L$ is different from those of other parts if the weight applied to a part near each suspension unit $III_R$, $III_L$, $IV_R$, $IV_L$ is different from those of other parts.

Besides, the height of a part near each wheel axle (not shown) is always measured by the vehicular height sensor 16 installed between each wheel axle and a vehicular body (not shown). Accordingly, in order to adapt the vehicular body to be set at a flat state, the control unit V sends a control signal to the leveling valve 7 and the anti-roll valve 10 if each height of a part near each suspension unit $III_R$, $III_L$, $IV_R$, $IV_L$ so that the heights of the right and left sides are controlled by the closing and opening operations of the anti-roll valve 10 while the heights of the front and rear sides are controlled by the operation of the leveling valves 7. Therefore, the vehicular height at each of the suspension units $III_R$, $III_L$, $IV_R$ and $IV_L$ is controlled to a desired level. The vehicular height controlling operation is carried out according to a biasing condition of the vehicular weight while according to the changing of the total vehicle weight caused by getting on or off of passengers.

When the vehicular speed sensor 15 detects that the vehicular speed is lower than a predetermined speed judged as a stopping condition, the spring coefficient selector valve 12 is set to have a high spring coefficient and the damping force selector valve 13 is set to have a maximum damping force in order to suppress the swinging of the automotive vehicle caused by the changing of the total vehicular weight which is caused, for example, by the getting on or off of passengers or loads. Under this condition, when the control unit V judges to lower the vehicular height according to the signal from the vehicular height sensor 15, the valves 7 and 12 are opened according to the signal from the control unit V so that the oil is drained from the suspension units. Simultaneously, a maximum orifice is selected in the damping force selector valve 13 so that the vehicular height is quickly adjusted.

After the vehicular height is adjusted at a desired level, a minimum orifice is selected in the damping force selector valve 13 so that the damping force becomes maximum. With this operation, the time for adjusting the vehicular height is shortened as compared with the case that the large orifice is selected in a vehicular height changing period.

When the engine is started, the pressurized oil is supplied to the suspension units while the vehicular height of the stopping vehicle is kept at a low level. Accordingly, this arrangement quickly adjusts the vehicular height to a suitable height for running.

Furthermore, it will be appreciated that the vehicle height lowering operation is carried out when the control unit V receives a signal informing to lower the vehicular height, for example, a signal informing an opening condition of a door.

Moreover, it will be appreciated that in accordance with the invention a damping force selector valve may operate to provide an intermediate valve of the damping force, higher than the minimum value provided by the large orifice and smaller than the maximum value provided by the small orifice of the suspension cylinder.

What is claimed is:

1. A vehicular height controlling arrangement for use in an automotive vehicle, comprising:
   means for changing a vehicular height, when operated;
   a vehicular speed sensor for detecting a speed of the automotive vehicle and outputting an informing signal representative of stoppage of the automotive vehicle;

a suspension cylinder connected to a body of the automotive vehicle and changeable in its length and damping force;

a damping force selector valve hydraulically connected to said suspension cylinder, said damping force selector valve taking one of at least a first state in which said suspension cylinder damping force takes a minimum value and a second state in which said suspension cylinder damping force takes a maximum value larger than that in the first state; and a control unit electrically connected to said vehicular height changing means, said vehicular speed sensor and said damping force selector valve, said control unit including means for outputting a control signal to said damping force selector valve to cause said damping force selector valve to take the first state, when said vehicular height changing means is operated and in response to said informing signal.

2. A vehicular height controlling arrangement as claimed in claim 1, further comprising a spring coefficient selector valve which is connected to said suspension cylinder so as to change a spring coefficient of said suspension cylinder according to a second control signal from said control unit.

3. A vehicular height controlling arrangement as claimed in claim 2, further comprising a plurality of accumulators connected to said suspension cylinder, one of said accumulators being connected to said suspension cylinder through said spring coefficient selector valve so as to be hydraulically communicated with said suspension cylinder when said spring coefficient selector valve is opened.

4. A vehicular height controlling arrangement as claimed in claim 1, further comprising an unload valve hydraulically connected to said suspension cylinder and electrically connected to said control unit, said unload valve being opened when the vehicular height is lowered.

5. A vehicular height controlling arrangement as claimed in claim 1, further comprising a control switch which is connected to said control unit, said control switch being turned on when the vehicular height controlling arrangement is operated.

6. A vehicular height controlling arrangement as claimed in claim 1, wherein said damping force selector valve takes said second state after changing of the vehicular height under the vehicle stopping condition.

7. A vehicular height controlling arrangement as claimed in claim 1, further comprising a vehicular door sensor which sends a door condition signal to said control unit under a door opening condition, said control unit sending a further control signal to said damping force selector valve to take said second state when the control unit receives the door condition signal from said vehicular door sensor.

8. A vehicular height controlling arrangement as claimed in claim 1, wherein said damping force selector valve takes a third state in which the damping force takes a middle value which is larger than the minimum value of the first state and smaller than the maximum value of the second state.

9. A vehicular height controlling arrangement for use in an automotive vehicle, comprising:

a vehicular speed sensor for detecting a speed of the automative vehicle and outputting a signal representative of stoppage of the automotive vehicle;

a suspension cylinder connected to a body of the automotive vehicle and changeable in its length and damping force;

a damping force selector valve hydraulically connected to said suspension cylinder, said damping force selector valve taking one of at least a first state in which said suspension cylinder damping force takes a minimum value and a second state in which said suspension cylinder force takes a maximum value larger than that in the first state;

means for changing a vehicular height when operated, said vehicular height changing means including a vehicular height sensor detecting a height of the automotive vehicle and a leveling unit hydraulically connected to said suspension cylinder through said damping force selector valve so as to change the length of said suspension cylinder to change the vehicular height; and a control unit electrically connected to said vehicular height changing means, said vehicular speed sensor and said damping force selector valve, said control unit including means for outputting a control signal to said damping force selector valve to cause said damping force selector valve to take the first state, in the time that said vehicular height changing means is operated and in response to said first signal.

10. A vehicular height controlling arrangement as claimed in claim 9, wherein said leveling unit includes a leveling valve and an anti-roll valve which are electrically connected to said control unit, said leveling valve and said anti-roll valve controlling the vehicular height according to said control signal.

11. A vehicular height controlling arrangement as claimed in claim 10, further including at least four suspension units, wherein said leveling valve controls front and rear suspension units, and said anti-roll valve controls right and left suspension units.

12. A vehicular height controlling arrangement as claimed in claim 9, wherein said leveling unit is connected to an oil pressure source which provides pressurized hydraulic oil to said suspension cylinder.

* * * * *

UNITED STATES PATENT AND TRADEMARK OFFICE
CERTIFICATE OF CORRECTION

PATENT NO. : 5,135,065
DATED      : August 4, 1992
INVENTOR(S) : Akira KAWASAKI et al.

It is certified that error appears in the above-identified patent and that said Letters Patent is hereby corrected as shown below:

On the title page, please amend the Assignee as follows:
after "Nissan Motor Co., Ltd., Yokohama, Japan" insert --; Kayaba Industry Co., Ltd., Tokyo, Japan--

Signed and Sealed this

Twelfth Day of October, 1993

Attest:

BRUCE LEHMAN

Attesting Officer    Commissioner of Patents and Trademarks